United States Patent
Doty

[15] 3,692,348
[45] Sept. 19, 1972

[54] PIPE GRIPPING TONGS

[72] Inventor: John T. Doty, 9936 E. Ramona Ave., Bellflower, Calif. 90706

[22] Filed: Sept. 3, 1970

[21] Appl. No.: 69,360

[52] U.S. Cl..................................294/106, 29/237
[51] Int. Cl..................................B66c 1/44
[58] Field of Search........294/88, 110, 113, 114, 115, 294/116, 67 BC, 106, 92; 214/650, 652; 285/39; 29/237

[56] References Cited

UNITED STATES PATENTS

| | | | |
|---|---|---|---|
| 2,226,789 | 12/1940 | Tupy | 294/106 |
| 3,561,615 | 2/1971 | Forsberg et al. | 29/237 |
| 2,670,174 | 2/1954 | Lucker | 29/237 |
| 2,789,001 | 4/1957 | Yonaki | 294/16 |

*Primary Examiner*—Evon C. Blunk
*Assistant Examiner*—Johnny D. Cherry
*Attorney*—Harold A. Dreckman

[57] ABSTRACT

When handling large diameter industrial pipe it is frequently necessary to move the pipe along its longitudinal axis, and either forwardly or backwardly, depending on the particular problem; and also pipe is frequently supported vertically while lowering the pipe into or removing the pipe from a well. The pipe which is being worked upon is securely gripped by the tongs, and the gripping action is achieved by a means other than the weight of the tongs itself and the pipe engaged thereby. A manually actuated tong operator is, therefore, employed to actuate the tongs and cause them to securely grip the outer surface of the pipe.

5 Claims, 9 Drawing Figures

PATENTED SEP 19 1972
3,692,348
SHEET 1 OF 2
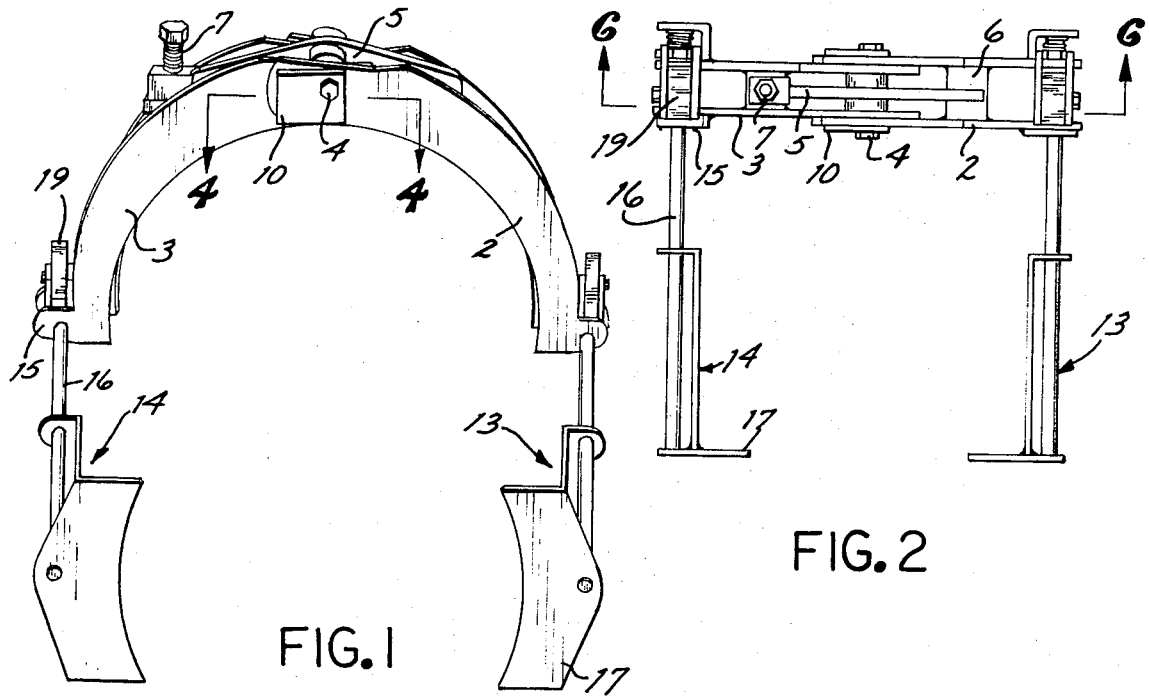
FIG. 1
FIG. 2
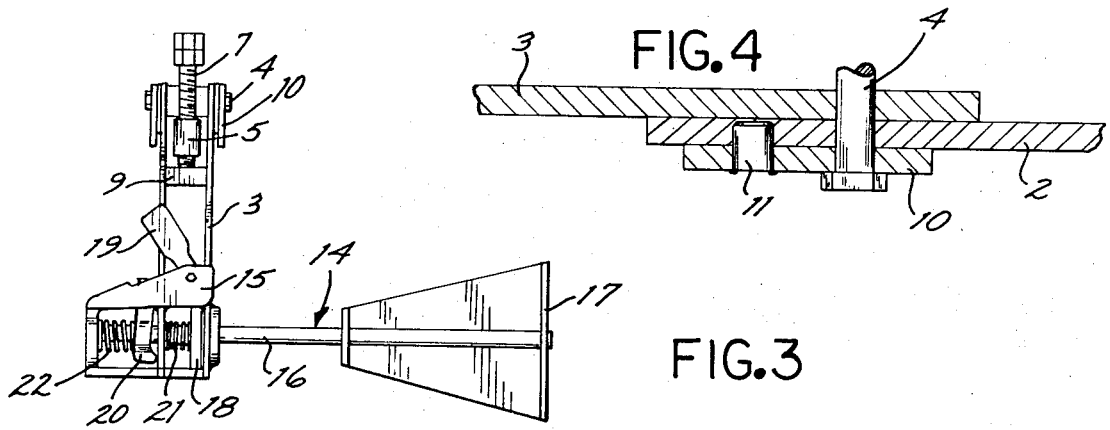
FIG. 4
FIG. 3
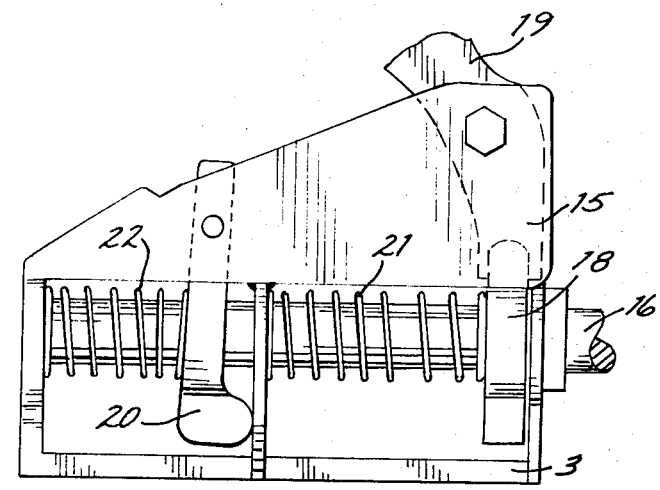
FIG. 5
INVENTOR.
JOHN T. DOTY
BY
ATTORNEY

INVENTOR.
JOHN T. DOTY
BY
ATTORNEY

PIPE GRIPPING TONGS

An object of my invention is to provide a novel pipe gripping tongs which can be caused to securely grip the pipe to achieve a longitudinal support for the pipe, as when moving the pipe along its longitudinal axis or vertically supporting the same.

Another object of my invention is to provide gripping arms on the tongs which can engage a pipe coupler to move the coupler lengthwise of the pipe and press the same into its operative position.

Another object is to provide a manually actuated means to cause the pipe gripping arms to swing inwardly and grip the pipe when the manual means is operated.

Other objects, advantages and features of invention may appear from the accompanying drawings, the subjoined detailed description and the appended claims.

IN THE DRAWINGS:

FIG. 1 is a perspective view of my tongs in open position.

FIG. 2 is a top plan view of my tongs.

FIG. 3 is a side elevation of my tongs.

FIG. 4 is a fragmentary sectional view taken on line 4—4 of FIG. 1.

FIG. 5 is a fragmentary side elevation of the ratchet type jack.

Figure 6:
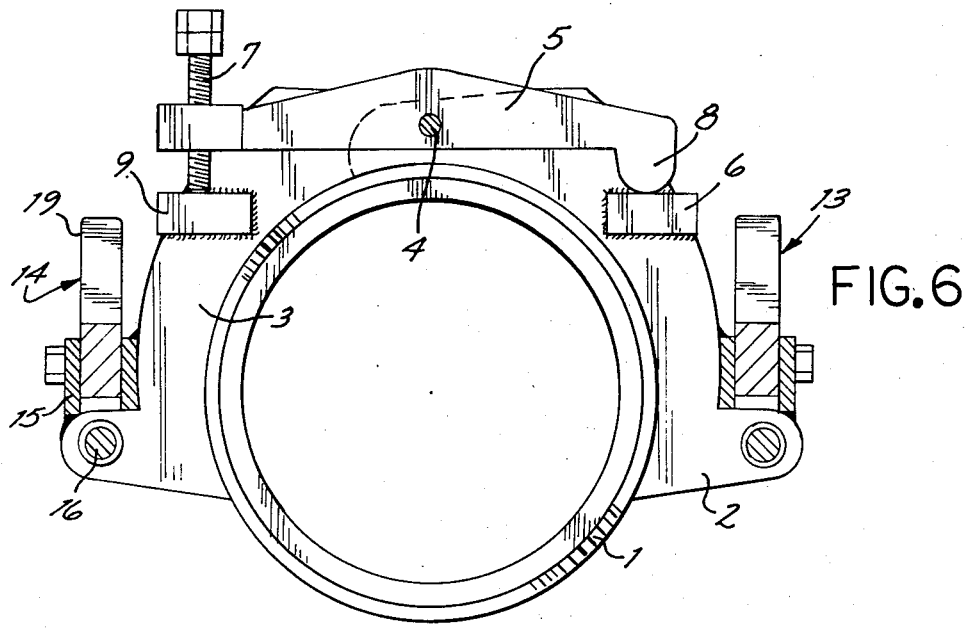
FIG. 6 is a sectional view taken on line 6—6 of FIG. 2.

Referring more particularly to the drawing, my pipe gripping tongs are adapted to engage a pipe 1 through an arc somewhat greater than 180°. The main gripping portion of the tongs consists of a first arcuate shoe 2 and a second arcuate shoe 3. The shoes 2 and 3 are pivotally mounted on the pin 4 at the upper central part of the tongs. The arcuate tongs 2 and 3 can thus partly encircle the pipe 1 and are caused to securely grip that pipe, as will be subsequently described. When the shoes 2 and 3 are gripping the pipe it will hold the entire tong assembly against slipping lengthwise of the pipe, either when a longitudinal force is applied to the pipe or when the pipe is suspended vertically in a well, or the like.

To cause the shoes 2 and 3 to swing inwardly and grip the pipe 1, I provide a manually operable camming means consisting of a cam arm 5 which is pivotally mounted on the pin 4. One end of the cam arm 5 engages a fixed lug 6 which projects inwardly from the shoe 2. A bolt 7 is threaded through the cam arm 5 at the end opposite the finger 8 which engages the lug 6. The bolt 7 engages an inwardly projecting lug 9 on the shoe 3, thus causing the shoes 2 and 3 to swing inwardly when the bolt 7 is screwed downwardly, causing the cam arm 5 to swing on the pin 4. Thus it is possible to securely clamp the pipe gripping tongs onto the pipe and the tongs can only be released by unscrewing the bolt 7 and again permitting the shoes 2 and 3 to swing outwardly on the pivot pin 4.

A centering plate 10 is mounted on the pin 4 and engages the pipe which is being supported in the tongs.

The centering plate 10 can be slightly tilted about the pin 4 by adjusting the pin 11 in appropriate holes in the shoe 2. Thus permitting a very slight diameter adjustment of the tongs which might occur, due to the manufacturing imperfections in the pipe, and different sized pipes.

Figure 7:
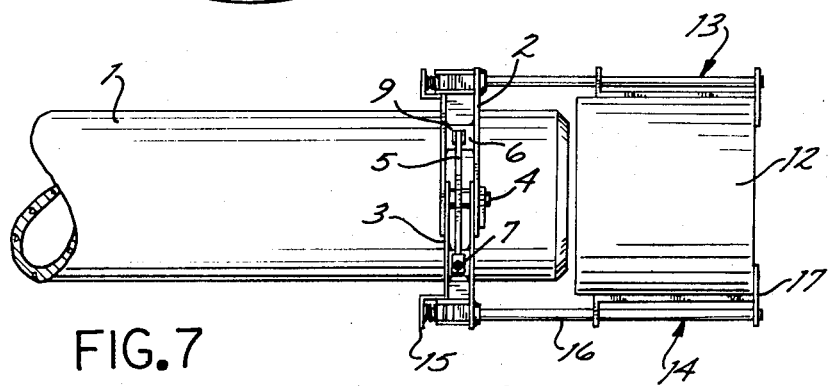
FIG. 7 is a top plan view of my tongs in position on a pipe and with the coupler engaging arms in one position.
Figure 8:
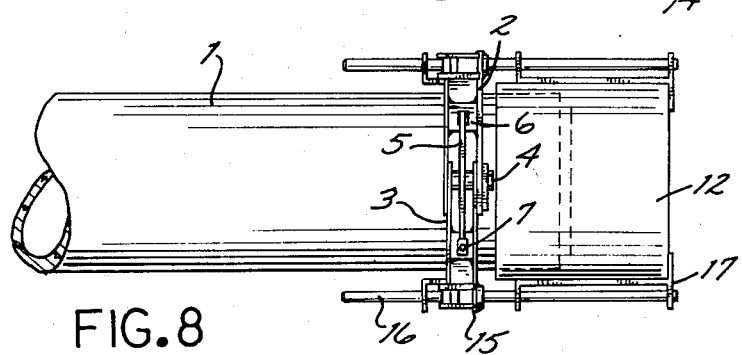
FIG. 8 is a view similar to FIG. 7 but showing the coupler in its operative position on a section of pipe.
Figure 9:
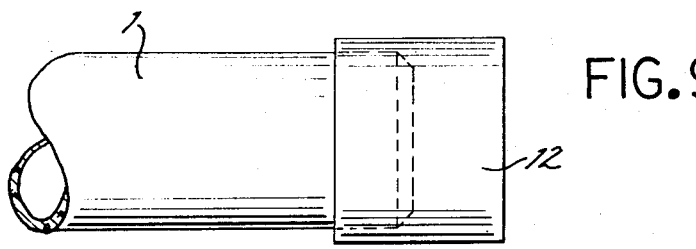
FIG. 9 is a side elevation of a coupler and pipe and illustrating the position of the coupler on the pipe.

In order to press a coupler 12 onto the end of a pipe 1, I provide a pair of coupler engaging fingers 13–14 which are mounted on the shoes 2–3 respectively in the following manner:

The coupler engaging fingers are attached to the respective shoes in identical manners and, consequently, only one mounting means will be described in detail. A mounting box 15 is fixedly attached to the outer end of the shoe 3. A rod 16 is slidably mounted in this box and the outer end of the rod is attached to a plate 17. This plate is bent inwardly to engage the edge of the coupler 12, as shown in FIGS. 7 and 8. When the rod 16 is pulled inwardly the fingers 17 will move the coupler 12 lengthwise of the pipe 1 and force that coupler onto the pipe to the position shown in FIG. 9. The rod 16 is moved by a ratchet type jack, which consists of a finger 18 which encircles the rod 16 and is pivotally mounted on the box 15. A jack handle actuator 19 on the finger 18 permits that finger to be moved step by step along the rod 16; thus causing the rod and the coupler engaging finger 17 to move in a direction towards the tongs, as will be evident. A backup finger 20 alternately engages the rod 16 to prevent accidental retraction of that rod, and also to hold the rod against movement while a new "bite" is being taken by the finger 18. Springs 21 and 22 are usual in a structure of this type and these springs hold the finger 18 and the backup finger 20 in their proper operating positions.

IN OPERATION

The tong shoes 2 and 3 are first placed in a position to partly encircle the pipe 1. The bolt 7 is now screwed downwardly to cause the cam arm 5 to swing on the pivot 4 while bearing against the lugs 6 and 9. This will swing the shoes 2 and 3 inwardly to securely grip the pipe 1 and will prevent the tongs from slipping lengthwise of the pipe. If a coupler 12 is to be mounted onto the pipe 1, it is placed between the fingers 17 on the coupler moving jack, after which the operator alternately swings the jack handle actuator 19 to move the rod 16 towards the shoes 2 and 3, thus pressing the coupler 12 onto the end of the pipe 1. By releasing the catch 20 the rod 16 can be released so that the pipe gripping tongs can be removed from the pipe.

Having described my invention, I claim:

1. A pipe gripping tongs comprising a pair of arcuate shoes; means pivotally mounting said shoes to each other, a cam arm pivotally mounted on said shoes and spanning said pivotal mounting means of said shoes, one end of said cam arm engaging one of said shoes, and the other end of said cam arm engaging the other of said shoes, adjusting means on said cam arm, a coupler engaging finger on each of said shoes, and means adjustably mounting a coupler engaging finger on each of said shoes, and said adjusting means on the cam arm comprising a bolt threaded through the cam arm and engaging a shoe.

2. A pipe gripping tongs comprising a pair of arcuate shoes; means pivotally mounting said shoes to each other, a cam arm pivotally mounted on said shoes and spanning said pivotal mounting means of said shoes, one end of said cam arm engaging one of said shoes, and the other end of said cam arm engaging the other of said shoes, adjusting means on said cam arm, a coupler engaging finger on each of said shoes, and means adjustably mounting a coupler engaging finger on each of said shoes, and said means adjustably mounting a coupler engaging finger on each of the shoes comprising a ratchet type jack.

3. A pipe gripping tongs comprising a pair of arcuate shoes; means pivotally mounting said shoes to each other, a cam arm pivotally mounted on said shoes and spanning said pivotal mounting means of said shoes, one end of said cam arm engaging one of said shoes, and the other end of said cam arm engaging the other of said shoes, adjusting means on said cam arm, a coupler engaging finger on each of said shoes, and means adjustably mounting a coupler engaging finger on each of said shoes, said adjusting means on the cam arm comprising a bolt threaded through the cam arm and engaging a shoe, and said means adjustably mounting a coupler engaging finger on each of the shoes comprising a ratchet type jack.

4. A pipe gripping tongs comprising a pair of arcuate shoes; means pivotally mounting said shoes to each other, a cam arm pivotally mounted on said shoes and spanning said pivotal mounting means of said shoes, one end of said cam arm engaging one of said shoes, and the other end of said cam arm engaging the other of said shoes, adjusting means on said cam arm, a coupler engaging finger on each of said shoes, and means adjustably mounting a coupler engaging finger on each of said shoes, said means pivotally mounting the shoes to each other comprising a pivot pin passing through the adjacent ends of the shoes, and said adjusting means on the cam arm comprising a bolt threaded through the cam arm and engaging a shoe.

5. A pipe gripping tongs comprising a pair of arcuate shoes; means pivotally mounting said shoes to each other, a cam arm pivotally mounted on said shoes and spanning said pivotal mounting means of said shoes, one end of said cam arm engaging one of said shoes, and the other end of said cam arm engaging the other of said shoes, adjusting means on said cam arm, a coupler engaging finger on each of said shoes, and means adjustably mounting a coupler engaging finger on each of said shoes, said adjusting means on the cam arm comprising a bolt threaded through the cam arm and engaging a shoe, said means pivotally mounting the shoes to each other comprising a pivot pin passing through the adjacent ends of the shoes, and said means adjustably mounting a coupler engaging finger on each of the shoes comprising a ratchet type jack.

* * * * *